United States Patent
Chappus

(10) Patent No.: US 10,035,231 B2
(45) Date of Patent: Jul. 31, 2018

(54) LOCKING SUPPORT ASSEMBLY FOR BAR MOUNTED TOOL ADAPTORS

(71) Applicant: Norgren Automation Solutions, LLC, Saline, MI (US)

(72) Inventor: Corey Chappus, Armada, MI (US)

(73) Assignee: Norgren Automation Solutions, LLC, Saline, MI (US)

( * ) Notice: Subject to any disclaimer, the term of this patent is extended or adjusted under 35 U.S.C. 154(b) by 385 days.

(21) Appl. No.: 14/955,753

(22) Filed: Dec. 1, 2015

(65) Prior Publication Data

US 2016/0151870 A1   Jun. 2, 2016

Related U.S. Application Data

(60) Provisional application No. 62/085,810, filed on Dec. 1, 2014.

(51) Int. Cl.
*B23Q 1/64* (2006.01)
*B23Q 7/14* (2006.01)
*B25J 15/00* (2006.01)

(52) U.S. Cl.
CPC ............ *B23Q 7/14* (2013.01); *B25J 15/0061* (2013.01)

(58) Field of Classification Search
USPC .................................. 269/21, 55, 56, 58, 59
See application file for complete search history.

(56) References Cited

U.S. PATENT DOCUMENTS

| | | | |
|---|---|---|---|
| 8,371,631 B2 | 2/2013 | Lin | |
| 8,607,441 B1 * | 12/2013 | Hurst | B23Q 7/00 29/721 |
| 8,684,418 B2 | 4/2014 | Lin et al. | |
| 8,702,340 B2 | 4/2014 | Lin et al. | |
| 8,770,566 B2 | 7/2014 | Takeda | |
| 9,522,421 B2 * | 12/2016 | Chappus | B21D 43/052 |
| 2012/0280527 A1 * | 11/2012 | Lin | B25J 15/0061 294/213 |

* cited by examiner

*Primary Examiner* — Joseph J Hail
*Assistant Examiner* — Shantese McDonald
(74) *Attorney, Agent, or Firm* — Young Basile Hanlon & MacFarlane, P.C.

(57) ABSTRACT

A tool support structure includes a base; a tool rail that extends in an axial direction; a first mounting portion that is connected to the base; a second mounting portion that is connected to a first end of the tool rail and releasably connectable to the first mounting portion; a support receiver that is connected to the base, the support receiver has a housing, a clamp member, and a locking member; and a support member that has a first portion and a second portion, wherein the second portion and at least part of the first portion are configured to enter an axial open end of the housing of the support receiver and a clamp member of the support receiver is pivoted into engagement with the support member by a locking member of the support to restrain motion of the support member with respect to the support receiver.

20 Claims, 5 Drawing Sheets

LOCKING SUPPORT ASSEMBLY FOR BAR MOUNTED TOOL ADAPTORS

CROSS-REFERENCE TO RELATED APPLICATION(S)

This application claims priority to and the benefit of U.S. Provisional Application No. 62/085,810, filed Dec. 1, 2014, the entire disclosure of which is hereby incorporated by reference.

BACKGROUND

In the field of workpiece transfer systems for manufacturing applications, tool mounting systems are used to connect tools to a moving member.

One known type of workpiece transfer system includes a bar that moves a workpiece between desired locations. Often the workpiece transfer system will move workpieces between workstations. Tools such as grippers or vacuum cups are attached to the bar and grasp the workpiece at one location and release the workpiece at another location. The tools often utilize pressurized air for actuation and therefore need numerous pneumatic couplings and conduits that are attached to the bar.

In many applications of workpiece transfer systems, clearance between the bar and the workstation is limited. Accordingly, each workpiece must fit within certain defined space restrictions. This may include pneumatic and electrical wires that supply and control actuation of the tools that are mounted to the workpiece transfer system.

It is often the case with many transfer systems that multiple workpiece configurations are fabricated on the same production line. The configuration of the machines and tools that perform manufacturing operations on the production line dies are changed over along with the tooling required to move the workpieces between stations. Rigidly attached tooling makes change over difficult and time consuming.

Accordingly, it is desirable to design a transfer system that provides for switching of tooling while remaining within the space limitations of the transfer system.

SUMMARY

One aspect of the disclosed embodiments is a tool support structure that includes a base, a tool rail that extends in an axial direction, a first mounting portion that is connected to the base, and a second mounting portion that is connected to a first end of the tool rail. The second mounting portion is releasably connectable to the first mounting portion for supporting the first end of the tool rail with respect to the base. The tool support structure also includes a support receiver and a support member. The support receiver is connected to the base. The support receiver has a housing, a clamp member, and a locking member. The housing defines an interior space, a slot that extends in the axial direction, and an axial open end in communication with the interior space and the slot. The slot has a first width adjacent to an exterior surface of the housing. The interior space has a second width adjacent to the slot that is wider than the first width. The clamp member is disposed within the housing adjacent to the slot and pivotally connected to the housing, the locking member being connected to the housing and operable to restrain movement of the clamp member. The locking member is movable between an engaged position and a disengaged position. The support member has a first portion and a second portion. The first portion is connected to the tool rail and is narrower than the first width. The second portion is wider than the first width. The second portion and at least part of the first portion are configured to enter the axial open end of the housing of the support receiver such that the second portion is disposed in the interior space of the housing and at least part of the first portion is disposed in the slot of the housing. The clamp member is pivoted into engagement with the support member when the locking member is in the engaged position to restrain motion of the support member with respect to the support receiver.

According to another aspect of the disclosed embodiments, a locking support assembly includes a support member and a support receiver. The support member is configured to connect to a tool rail, and includes a first portion connectable to a tool rail and a second portion. The support receiver is configured to connect to a base, and includes a housing, a clamp member, and a locking member. The first portion of the support member has a first width, the second portion has a second width that is greater than the first width, and the first portion extends transversely away from the second portion. The housing of the support receiver defines an interior space, a slot extending in an axial direction adjacent the interior space, and an axial open end in communication with the interior space and the slot. The slot has a third width adjacent to an exterior surface of the housing, which is greater than the first width for receiving the first portion of the support member therein and which is less than the second width. The interior space has a fourth width adjacent to the slot which is greater than the second width for receiving the second portion of the support member therein. The clamp member is disposed within the housing adjacent to the slot and is pivotally connected to the housing to engage and restrain the support member. The locking member is connected to the housing and operable to engage and restrain the clamp member. The locking member being movable between an engaged position and a disengaged position.

According to another aspect of the disclosed embodiments, a tool support structure includes a base, a tool rail, and one or more locking support assemblies. The tool rail extends in an axial direction. The one or more locking support assemblies are configured to releasably mount the tool rail to the base. Each locking support assembly includes a support member connected to the tool rail, and includes a support receiver associated with the support member connected to the base. The support member of each locking support assembly includes a first portion connected to the tool rail and a second portion. The first portion has a first width, the second portion has a second width that is greater than the first width, and the first portion extends transversely away from the second portion. The support receiver of each locking support assembly includes a housing coupled to the base, a clamp member, and a locking member. The housing defines an interior space, a slot extending in an axial direction adjacent the interior space, and an axial open end in communication with the interior space and the slot. The slot has a third width adjacent to an exterior surface of the housing, which is greater than the first width for axially receiving the first portion of the support member therein and which is less than the second width. The interior space has a fourth width adjacent to the slot, which is greater than the second width for axially receiving the second portion of the support member therein. The clamp member is disposed within the housing adjacent to the slot and is pivotally connected to the housing to engage and restrain the support member. The locking member is connected to the housing and is operable to engage and restrain the clamp member. The locking member is movable between an engaged position and a disengaged position.

BRIEF DESCRIPTION OF THE DRAWINGS

The various other uses of the workpiece transfer system and its various embodiments disclosed herein will become more apparent by referring to the following detailed description and drawings in which.

DETAILED DESCRIPTION

Figure 1:
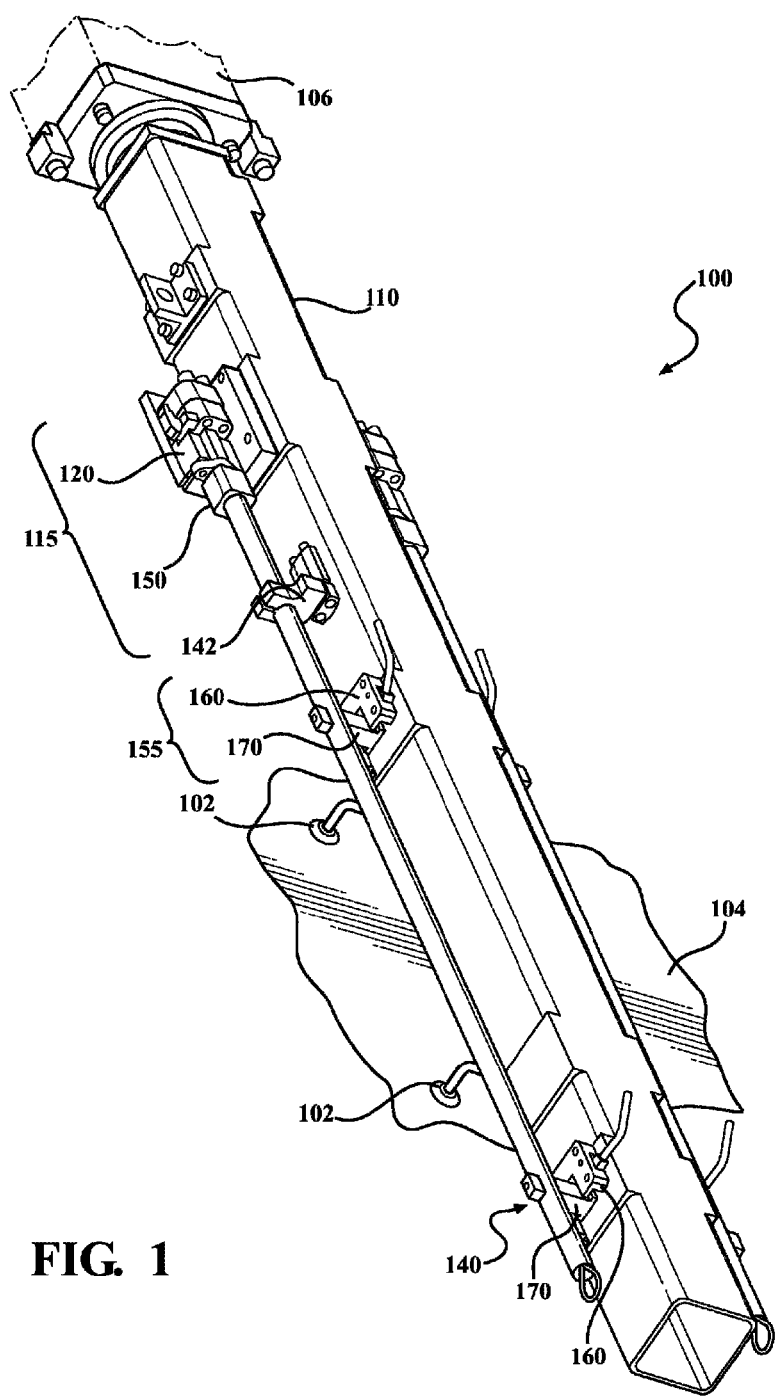
FIG. 1 is a perspective view showing a workpiece transfer system that includes a plurality of locking support assemblies.

FIG. 1 shows a workpiece transfer system 100 that can be utilized to move a workpiece 104 between workstations (not shown). The workpiece transfer system 100 can include a base, such as a bar 110, and a tool support structure that is connectable to the base, such as a tool rail 140. A plurality of mounting structures are connected to the tool rail 140 and allow the tool rail 140 to be connected and disconnected with respect to the base, as will be discussed herein. The tool rail 140 supports one or more tools 102, thereby allowing the tools to be connected and disconnected with respect to the bar 110. The tools 102 in the illustrated example are pneumatically actuated suction cups. However, other tools are known that can be supported by the tool rail 140, such as mechanical grippers and part present sensing devices.

The bar 110 is connectable to an automated motion control system, such as a robotic arm 106, to allow movement of the workpiece transfer system 100. In order to allow connection of the tool rail 140 to the bar 110, a plurality of mounting structures can be formed on or connected to the bar 110. The mounting structures can include a mount plug assembly 115 and one or more locking support assemblies 155. The mount plug assembly 115 can include a mount plug receiver 120 that is connected on or formed on the bar 110, and a mount plug 150 that is connected to the tool rail 140 for releasable connection to the mount plug receiver 120 as discussed in further detail below. The locking support assemblies 155 can each include a support receiver 160 that is connected to the bar 110 and a support member 170 that is connected to the tool rail 140 for releasable connection to the support receiver 160.

Figure 2:
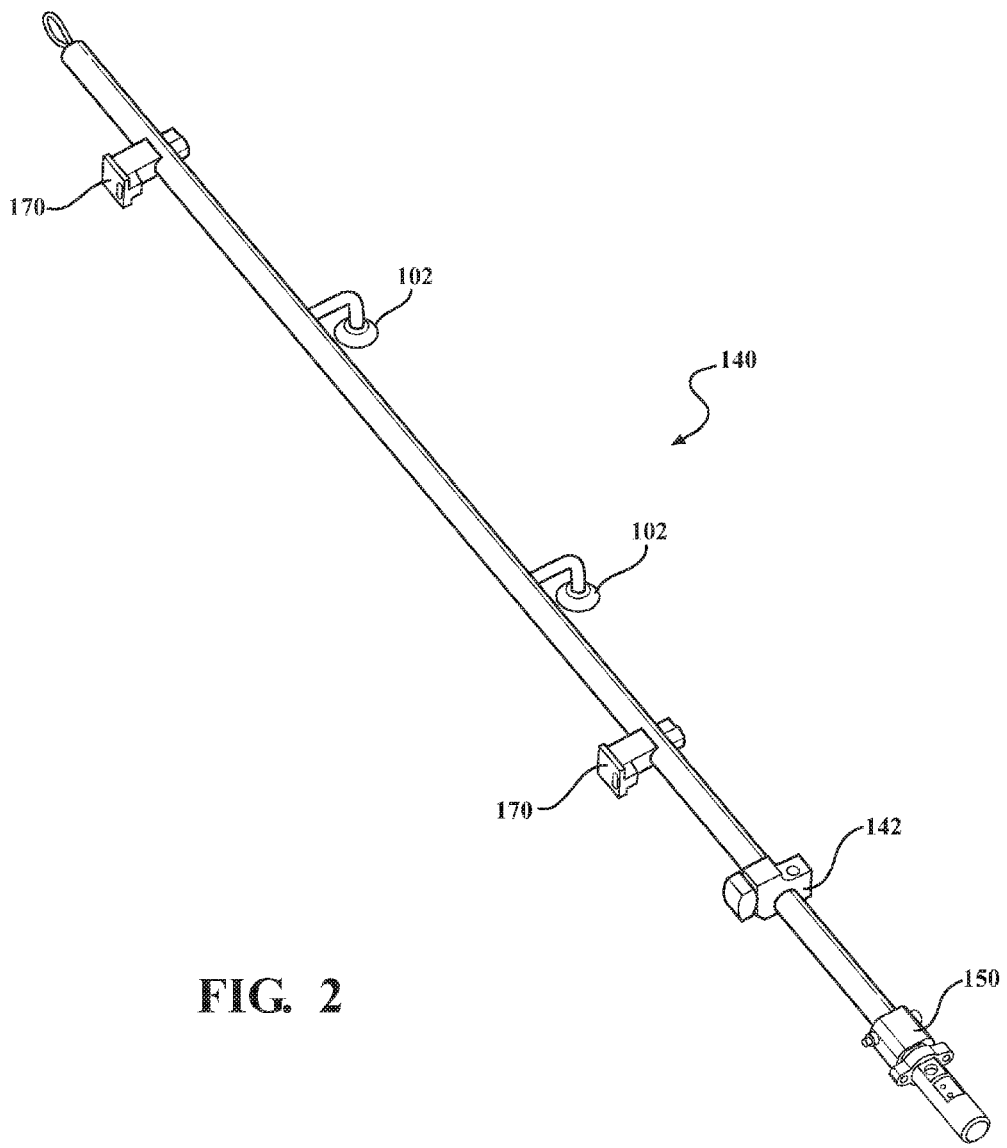
FIG. 2 is a perspective view showing a tool rail of the workpiece transfer system.

As shown in FIGS. 1-2, the tool rail 140 is an elongate structure that extends in an axial direction, parallel to the bar 110. The tool rail 140 can have any desired cross-sectional shape, such as circular, square, rectangular, or polygonal. The tool rail 140 can have smooth exterior surfaces or include surface features, such as serrations or splines. The tool rail 140 can be tubular or solid. For the purpose of describing the workpiece transfer system 100 disclosed herein and its various components, the tool rail 140 and bar 110 are illustrated and described as nominally having a generally horizontal orientation (i.e., the axial direction is horizontal) with the locking support assemblies 155 and mount plug assembly 115 having spatial orientations attendant thereto. However, in use, movement of the bar 110 may cause the tool rail 140 and various other components of the workpiece transfer system 100 to be in different spatial orientations, and other static orientations are possible.

To connect the tool rail 140 to the mount plug receiver 120, a mount plug 150 is located at a first end of the tool rail 140. The mount plug 150 can extend in the axial direction of the tool rail 140 and can extend axially outward from the first end of the tool rail 140. The mount plug 150 can be moved between a connected position and a disconnected position with respect to the mount plug receiver 120. In one implementation, at least a portion of the movement of the mount plug 150 between the disconnected position and the connected position is movement in the axial direction of the tool rail 140. The mount plug 150 can be lockable with respect to the mount plug receiver 120, for example, by a selectively engageable latch or other structure that is incorporated in the mount plug receiver 120.

In some implementations, the mount plug receiver 120 and the mount plug 150 can cooperate to define electrical and/or pneumatic connections between the bar 110 and the tool rail 140. Alternatively, electrical and/or pneumatic connections between the bar 110 and the tool rail 140 can instead or additionally be provided elsewhere along the tool rail 140, such as at a connector block 142 that is mounted to the tool rail 140.

In order to support the tool rail 140 with respect to the bar 110, one or more of the support members 170 are connected to the tool rail 140 at axially spaced locations, between the mount plug 150 and the second end of the tool rail 140. In the illustrated example, the tool rail 140 includes two of the support members 170 that are each connectable to respective one of two of the support receivers 160 that are disposed on the bar 110 at spaced locations that correspond to the spacing between the support members 170.

Figure 3:
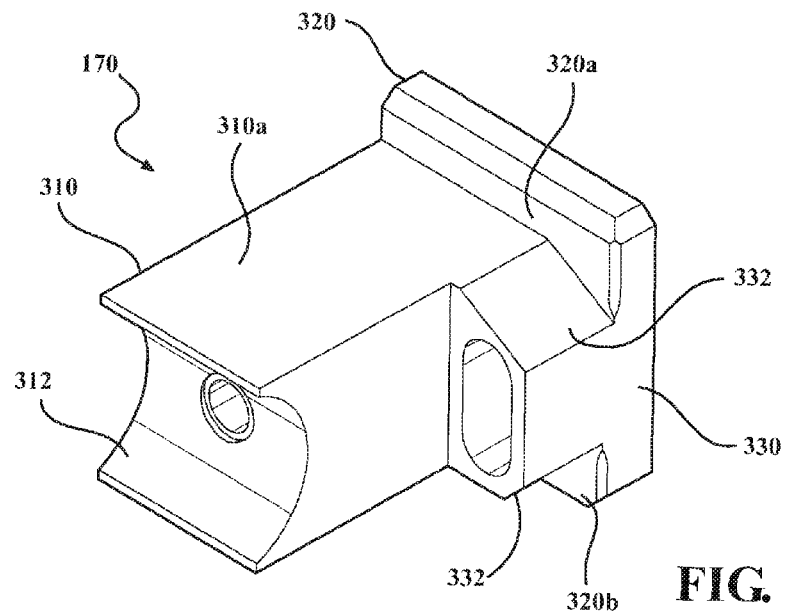
FIG. 3 is a left-side perspective view showing a support member of the locking support assembly.

FIG. 3 is an illustration showing the support member 170. The support member 170 includes a first portion such as a body portion 310 and a second portion such as a foot portion 320. The body portion 310 is connected to the tool rail 140 at a first end of the support member 170, and the foot portion 320 is disposed at a second end of the support member 170. The body portion 310 and the foot portion 320 of the support member 170 can be formed integrally such that the support member 170 is a unitary single-piece structure. The support member 170 can be fabricated from metal or from any other suitable material.

The support member 170 is connected to the tool rail 140 such that it extends outward from the tool rail 140 in a direction that is transverse (e.g. roughly perpendicular) to the axial direction of the tool rail 140. The support member 170 can be connected to the tool rail 140 by a structure that prevents movement of the support member 170 with respect to the tool rail 140, in both the axial and rotational directions. For example, a conventional fastener such as a bolt can extend through the tool rail 140 and into the body portion 310 of the support member 170 to fix the axial and rotational position of the support member 170 with respect to the tool rail 140.

The body portion 310 of the support member 170 has a length, in a direction transverse and outward from the axial direction of the tool rail 140, that corresponds to a desired spacing of the tool rail 140 from the bar 110. As in the illustrated example, the body portion 310 can have a square or rectangular cross-sectional shape when viewed in a direction transverse to the axial direction of the tool rail 140, for example, with an upper surface 310a and a lower surface 310b that are substantially parallel. Other cross-sectional shapes can be used. At the first end of the support member 170, the body portion 310 can be contoured in a manner that is complementary to the cross-sectional shape of the tool rail 140. In the illustrated example, an arcuate surface 312 is formed on the body portion 310 at the first end of the support member 170. The arcuate surface 312 is concave and is shaped complementarily to the round cross-sectional shape of the tool rail 140. Other types of contoured surfaces can be formed on the body portion 310 as needed.

The foot portion 320 of the support member 170 has a width, transverse to the axial direction of the tool rail 140 and transverse to the length of the body portion 310, that is greater than a width of the body portion 310. In the orientation shown in FIGS. 3 and 7-8, the widths of the body portion 310 and the foot portion 320 are measured in a vertical direction. For example, and as shown, the foot portion 320 includes upper and lower flanges 320a, 320b, which, respectively, extend upward and downward from the body portion 310. As will be explained herein, the greater width of the foot portion 320 as compared to the body portion 310 allows the support member 170 to be connected to and retained by the support receiver 160. At a leading end of the support member 170, a leading surface 330 (i.e., that which first enters the housing 410 during insertion of the support member 170 into the support receiver 160) is defined by the body portion 310 and the foot portion 320 in combination. The leading surface 330 can be T-shaped, according to the differing widths of the body portion 310 and the foot portion 320. The width of the leading surface 330 can be less than that of the body portion 310 in the area of the leading surface 330 adjacent to the body portion 310, with tapered surfaces 332 transitioning between the two widths (i.e., between of the body portion 310 and the leading surface 330 in the vertical direction as shown). In the orientation shown in FIGS. 3 and 7-8, the width of the leading surface 330 is measured in a vertical direction.

Figure 4:
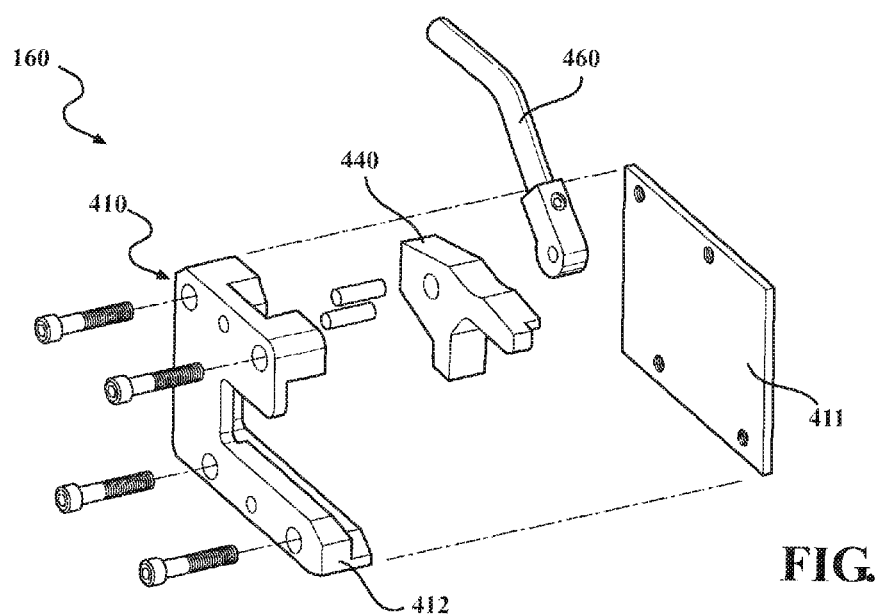
FIG. 4 is a perspective exploded view of a support receiver of the locking support assembly.
Figure 5:
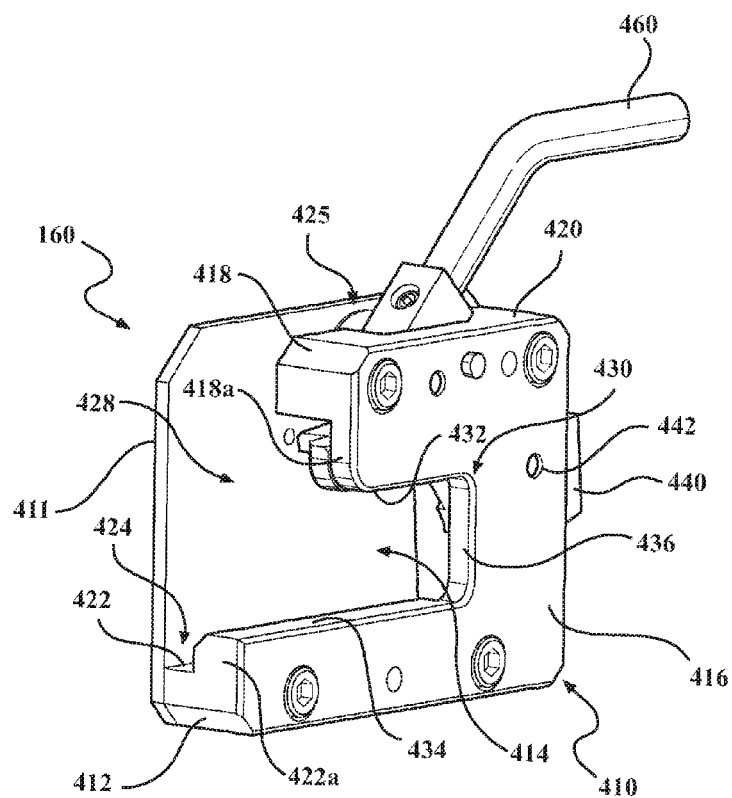
FIG. 5 is a perspective view showing the support receiver of the locking support assembly.

FIGS. 4-5 show the support receiver 160. The support receiver 160 includes a housing 410, a clamp member 440, and a locking member 460.

In the illustrated example, the housing 410 of the support receiver 160 is a two-piece structure that includes an inner housing member 411 (i.e., positioned nearer to the bar 110) and an outer housing member 412 (i.e., positioned further from the bar 110 than the inner housing member 411). The inner housing member 411 provides a smooth, rigid, interior surface for housing 410 to prevent surface defects on the underlying structure (e.g. the bar 110) from interfering with smooth operation of the support assembly (e.g., receipt of the support member 170 therein, as well as actuation of the clamp member 440 or locking member 460). In other implementations, the inner housing member 411 can be omitted, such as when the surface of the underlying structure is large, flat, and smooth.

The outer housing member 412 is configured to define an interior space 414 for the housing 410 in cooperation with the inner housing member 411. An outer wall 416 of the outer housing member 412 has a nominal thickness and an inner surface that is spaced from an inner surface of the inner housing member 411. The interior space 414 is an area between the inner surface of the outer wall 416 of the outer housing member 412 and the inner surface of the inner housing member 411 in which the clamp member 440 and the locking member 460 are at least partially located.

In the illustrated example, to define the interior space 414, the outer wall 416 of the outer housing member 412 is connected to the inner housing member 411 and spaced from the inner housing portion by a first spacer portion 418, a second spacer portion 420, and a third spacer portion 422. The first spacer portion 418 is positioned at the top-front of the housing 410 (i.e., the front of the housing 410 being a region at which the support member 170 can be inserted into the housing 410), the second spacer portion 420 is positioned at the top-rear of the housing 410 (i.e., the rear of the housing 410 being a region positioned opposite to the front of the housing 410), and the third spacer portion 422 is positioned at the bottom of the housing 410 and extends from the front to the rear of the housing 410. The first spacer portion 418, the second spacer portion 420, and the third spacer portion 422 extend inward from the inner surface of the outer wall 416 toward the inner housing member 411.

Figure 7:
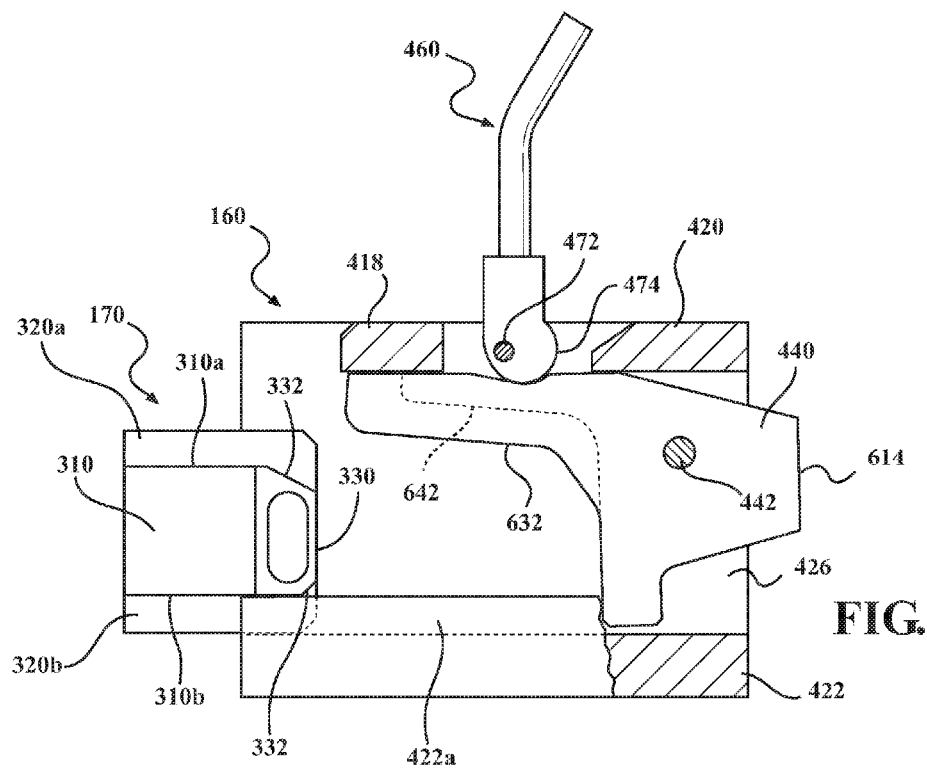
FIG. 7 is a partial cross-section view showing the locking support assembly in a disconnected position.
Figure 8:
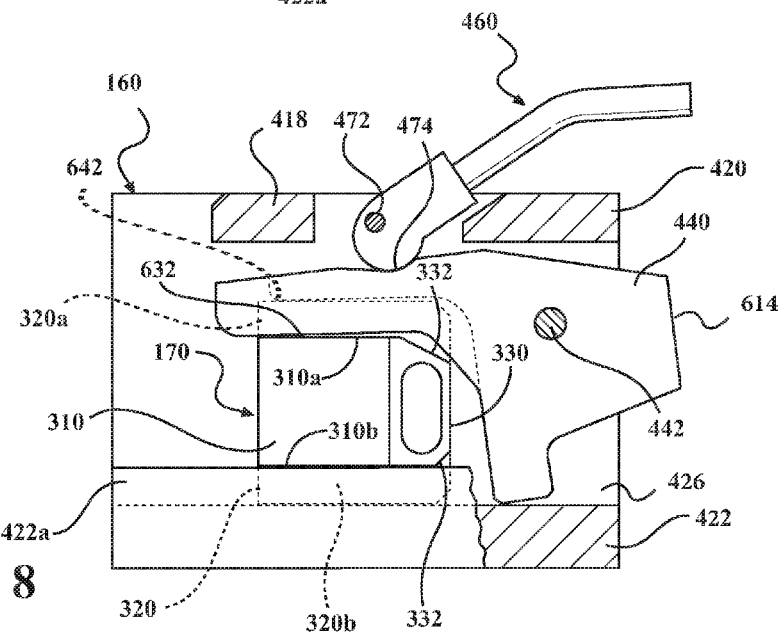
FIG. 8 is a partial cross-section view showing the locking support assembly in a connected position.

A top opening 425 is disposed between the first spacer portion 418 and the second spacer portion 420 at a top side of the housing 410, with the locking member 460 extending through it, so as to engage the clamp member 440. A rear opening 426 is formed between the second spacer portion 420 and the third spacer portion 422. A portion of the clamp member 440 extends through the rear opening 426. An axial open end 428 is formed between the first spacer portion 418 and the third spacer portion 422 and is in communication with the interior space 414 and with a slot 430 that is defined in the outer wall 416 of the outer housing member 412. The axial open end 428 is generally arranged at the forward side of the housing 410, so as to receive the support member 170 therein generally in the axial direction of the tool rail 140. The slot 430 is formed through the outer wall 416, extends in the axial direction, and is defined by an upper slot side 432, a lower slot side 434, and a slot end 436. The slot 430 has a first width, measured from the upper slot side 432 to the lower slot side 434. In the orientation shown in FIGS. 5 and 7-8, the width of the slot 430 is measured in a vertical direction. Adjacent to the slot 430, the interior space 414 defines a second width, measured from the first spacer portion 418 to the third spacer portion 422. In the orientation shown in FIGS. 5 and 7-8 the second width (i.e., of the space 414) is measured in a vertical direction. The second width is larger than the first width, with parts of the outer wall 416 forming, respectively, upper and lower overhangs 418a, 422a (e.g., flanges) that are spaced from the inner housing member 411 adjacent to the upper slot side 432 and the lower slot side 434. The result is that the axial open end 428 assumes a T-shaped configuration when viewed in the axial direction, with the first width of the slot 430 forming the narrow part of the T-shape. Furthermore, as shown in FIGS. 5 and 7-8, the first width (i.e., of the slot 430) may be generally constant, so as to be complementary to the parallel upper and lower surfaces 310a, 310b of the body portion 310 received therebetween. In this manner, the upper slot side 432 and the lower slot side 434 (i.e., defining the slot 430) may prevent or limit rotation of the body portion 310 and, thereby, the support member 170 positioned therein.

As depicted in the figures (see, e.g., FIGS. 5, 7, and 8), the T-shaped configuration of the axial open end 428 of the support receiver 160, as defined by the housing 410 and the clamp member 440, is complementary to the T-shaped configuration of the support member 170 described previously. This configuration of the axial open end 428 allows the support member 170 to enter the housing 410 in the axial direction by front-to-rear motion and to be retained therein by engagement of the foot portion 320 of the support member 170 with the inner surface of the outer wall 416 of the housing 410. The width of the body portion 310 of the support member 170 is less than the first width of the slot 430 (i.e., measured from the upper slot side 432 to the lower slot side 434) of the outer housing member 412, thereby allowing the body portion 310 of the support member 170 to be received within and removed from the slot 430. The width of the foot portion 320 of the support member 170 is less than the width of the interior space 414 (i.e., the second width measured from the first spacer portion 418 to the third spacer portion 422), thereby allowing the foot portion 320 to be received within and removed from the interior space 414. Additionally, the width of the foot portion 320 is greater than the width of the slot 430 (e.g., in the vertical direction as shown in FIGS. 7-8), so as to prevent insertion or removal of the support member 170 from the housing 410 in a direction transverse to the axial direction. Thicknesses of the upper and lower flanges 320a, 320b of the foot portion 320 are, respectively, less than distances between each of the overhangs 418a, 422a (e.g., flanges) and the inner surface of the inner housing member 411, thereby allowing the foot portion 320 to be received or slide therebetween. In the orientation shown in FIGS. 3 and 7-8, the thicknesses of the upper flange 320a and lower flange 320b of the foot portion are measured in a horizontal direction transverse to the axial direction.

As is also depicted in the figures (see, e.g., FIGS. 5, 7, and 8), the support receiver 160 can be configured to facilitate alignment of the support member 170 with the interior space 414 and the slot 430 of the housing 410 for insertion therein. For example, in the orientation shown, the support receiver 160 is configured to initially align the support member 170 with the interior space 414 prior to insertion therein in both vertical and horizontal directions, which are transverse to the direction of insertion (i.e., the axial direction). To provide vertical alignment, the lower slot side 434 of the outer housing member 412 may extend in a generally horizontal direction (e.g., in the axial direction of the tool rail 140) further from the slot end 436 than the upper slot side 432. The lower slot side 434 thereby provides a vertically unobstructed shelf upon which the support member 170 can be rested prior to insertion (e.g., by sliding) of the support member 170 into the interior space 414 and slot 430 of the housing 410 (see, e.g., FIG. 7).

To provide horizontal alignment in a direction transverse to the direction of insertion (i.e., transverse to the axial direction), the housing includes a lower channel 424 defined between the inner housing member 411 and the overhang 422a (e.g., flange) adjacent to the lower slot side 434 (see, e.g., FIG. 5). The lower channel 424 is configured to receive the lower flange or portion 320b of the foot portion 320 of the support member 170 (i.e., the lower arm of the T-shaped profile of the support member 170) with horizontal movement transverse to the axial direction being restricted between the overhang 422a and the inner housing member 411. Furthermore, the lower channel 424 can include a vertically tapered entry that centers or guides the support member 170 into horizontal, transverse alignment with the interior space 414 of the housing 410. For example, as shown in FIG. 5, the overhang 422a can include an angled surface extending downward from the lower slot side 434 and toward the inner housing member 411, which can receive thereagainst the lower flange 320b of the foot portion 320 of the support member 170, such that the angled surface guides the foot portion 320 toward the inner housing member 411 and into alignment with the interior space 414 of the housing 410.

Configuring the support receiver 160 to facilitate alignment of the support member 170 in the manner described above may be particularly advantageous for workpiece transfer systems 100 having multiple supporting structures (e.g., two locking support assemblies 155 and one mount plug assembly 115 as shown in FIG. 1). In particular, the workpiece transfer system 100 shown requires simultaneous insertion/removal of the support members 170 into the support receivers 160 by virtue of attachment of the support members 170 to the tool rail 140 and attachment of the support receivers 160 to the bar 110. Furthermore, insertion of the one or more support members 170 into corresponding support receivers 160 may also occur simultaneously with insertion of the mount plug 150, which is connected to the tool rail 140, into the mount plug receiver 120, which is connected to the bar 110.

Figure 6:
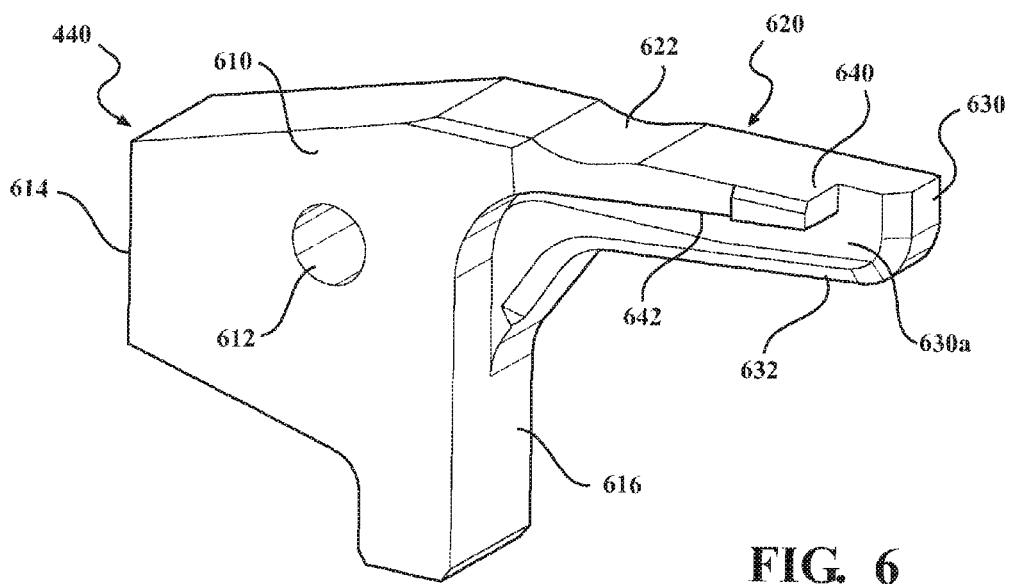
FIG. 6 is a perspective showing a clamp member of the support receiver.

The clamp member 440 is pivotally mounted to the housing 410, such as by an axle 442. As seen in FIG. 6, the clamp member 440 includes a body portion 610 and an engaging finger 620. An aperture 612 extends through the body portion 610 for pivotally mounting the clamp member 440 using the axle 442. A rear surface 614 of the body portion 610 is located opposite the engaging finger 620, and the body portion 610 can be configured to have sufficient mass between the aperture 612 and the rear surface 614 to cause upward rotation of the engaging finger 620 in the absence of external forces. Thus, the center of mass of the clamp member 440 can be located generally between the aperture 612 and the rear surface 614. As will be seen, this allows the engaging finger 620 to rise (i.e., into a normally biased position) and allow the support member 170 to enter the housing 410.

A front surface 616 of the body portion 610 is positioned adjacent to the engaging finger 620 and is engageable with the leading surface 330 of the support member 170. Because the rear surface 614 extends out of the housing 410 as previously explained, force can be applied to the rear surface 614, which causes the front surface 616 of the body portion 610 to rotate about the axle 442 and displace forward into engagement with the leading surface 330 of the support member 170, so as to aid in removing the support member 170 from the support receiver 160.

The engaging finger 620 has a stepped configuration that includes a wide portion 630 that extends the length of the engaging finger 620 and a narrow portion 640 that extends a majority of the length of the engaging finger 620. In the orientation shown in FIGS. 5-8, the length of the engaging finger 620 is measured in the axial direction, while the widths of the wide portion 630 and the narrow portion 640 are measured in a generally vertical direction. The stepped configuration of the finger 620 further defines the T-shaped configuration of the support receiver 160 for receiving and retaining the foot portion 320 and body portion 310 of the support member 170 therein. When the clamp member 440 is assembled to the housing 410, the wide portion 630 is adjacent to the outer wall 416 and the narrow portion 640 is adjacent to the inner housing member 411 such that it spaces the wide portion 630 from an inner housing member 611. Thus, the wide portion 630 forms an overhang or flange 630a that is spaced from the inner housing member 411. This allows the upper flange 320a of the foot portion 320 of the support member 170 to be disposed between the flange 630a of the wide portion 630 of the clamp member 440 and the inner housing member 411, such that a first engaging surface 632 (i.e., a first lower surface) of the wide portion 630 is engageable with the body portion 310 of the support member 170 and a second engaging surface 642 of the narrow portion 640 of the support member 170 is engageable with the foot portion 320 of the support member 170. In the orientation shown in FIGS. 5-8, the lower surface of the wide portion 630 of the clamp member 440 is positioned adjacent to and below the lower surface of the narrow portion 640.

FIGS. 7-8 show the locking support assembly in a disconnected position (FIG. 7) and a connected position (FIG. 8). As described previously, as shown in FIG. 7, the support member 170 may initially be placed on the extended lower slot side 434 in the channel 424 in alignment with the T-shaped interior space 414 in the housing 410 of the support receiver 160. The support member 170 enters the axial open end 428 of the housing of the support receiver by moving axially from front to rear of the housing 410, with the foot portion 320 partially behind the overhang 422a defined by the outer wall 416. The locking member 460 is initially in an unlocked position (FIG. 7), which allows the engaging finger 620 of the clamp member 440 to rotate upward (i.e., into a normally biased position for receiving the support member 170). The support member 170 continues moving axially into the support receiver 160 until the body portion 310 is located in the slot 430.

The locking member 460 is then moved from the unlocked position to the locked position (FIG. 8) by pivoting the locking member 460, such as on an axle 472, such that a cam surface 474 (e.g. an arcuate surface that is eccentric with respect to the axle 472) of the locking member 460 engages the clamp member 440 on a cam seat 622 that is formed between the aperture 612 (i.e., the pivot axis of the clamp member 440) and the end of the engaging finger 620, which causes the engaging finger 620 of the clamp member 440 to rotate downward into engagement with the support member 170. This engages the first engaging surface 632 with the body portion 310 of the support member 170 and engages the second engaging surface 642 with the foot portion 320. As a result of this engagement, the support member 170 is compressed between the housing 410 and the clamp member 440 so as to be restrained against moving in an axial direction with respect to the support receiver 160. While the locking member 460 remains in the locked position, the locking member 460 restrains movement of the clamp member 440 to maintain the engagement of the clamp member 440 with the support member 170. Horizontal movement of the support member 170 in a direction transverse to the axial direction is restricted by the lower portion 320b of the foot portion 320 being positioned in the channel 424 of the housing 410 (i.e., between the flange 422a and the inner housing member 411) and by the upper portion or flange 320a of the foot portion 320 being positioned between the flange 630a of the clamp member 440 and the inner housing member 411.

When the locking member 460 is moved to the unlocked position, the force applied by the clamp member 440 to the support member 170 lessens and the clamp member 440 may disengage the support member 170 as it rotates to its normally biased position, thereby allowing removal of the support member 170 from the housing 410. Additionally, the rear surface 614 of the clamp member 440 may be pressed to cause rotation of the clamp member 440, such that the first engaging surface 632 and the second engaging surface 642 of the clamp member 440 disengage upper surfaces of the foot portion 320 and the body portion 310, respectively, and to cause the front surface 616 of the clamp member 440 to engage and press the leading surface 330 of the body portion 310 outward from the housing 410.

While the description is made in connection with certain embodiments, it is to be understood that the disclosure is directed to various modifications and equivalent arrangements included within the scope of the claims, which are to be accorded the broadest reasonable interpretation as is permitted under the law so as to encompass such modifications and equivalent arrangement.

What is claimed is:

1. A locking support assembly comprising:
    a support member configured to connect to a tool rail, the support member comprising a first portion and a second portion, the first portion being connectable to the tool rail;
    a support receiver configured to connect to a base, the support receiver comprising a housing, a clamp member, and a locking member,
    wherein the first portion of the support member has a first width, the second portion has a second width that is greater than the first width, and the first portion extends transversely away from the second portion;
    wherein the housing of the support receiver defines an interior space, a slot extending in an axial direction adjacent the interior space, and an axial open end in communication with the interior space and the slot, the slot having a third width adjacent to an exterior surface of the housing, which is greater than the first width for receiving the first portion of the support member therein and which is less than the second width, and the interior space having a fourth width adjacent to the slot, which is greater than the second width for receiving the second portion of the support member therein;
    wherein the clamp member is disposed within the housing adjacent to the slot and is pivotally connected to the housing to engage and restrain the support member; and
    wherein the locking member is connected to the housing and operable to engage and restrain the clamp member, the locking member being movable between an engaged position and a disengaged position.

2. The locking support assembly according to claim 1, wherein the support member is arranged in an orientation with the widths being measured vertically, the second portion extends upward and downward from the first portion.

3. The locking support assembly according to claim 2, wherein the clamp member includes a stepped portion configured to engage the first portion and the second portion of the support member simultaneously at different elevations.

4. The locking support assembly according to claim 1, wherein when the support member and the support receiver are arranged in an orientation with the widths being measured vertically, the clamp member is configured to engage the support member in a vertical direction to restrain the support member, and a rear portion of the clamp member is accessible through the housing for manually pivoting the clamp member out of vertical engagement.

5. The locking support assembly according to claim 4, wherein manually pivoting the clamp member causes the clamp member to at least partially push the first portion of the support member out of the slot and the second portion of the support member out of the interior space.

6. The locking support assembly according to claim 4, wherein the clamp member has a center of gravity that pivots the clamp member into a normally biased position in which the clamp member does not restrain the support member.

7. The locking support assembly according to claim 1, wherein the housing includes an upper slot side, a lower slot side, and a slot end that collectively define the slot, and the lower slot side extends further from the slot end than does the upper slot side.

8. The locking support assembly according to claim 7, wherein the housing includes a channel adjacent to and below the lower slot side, the channel being configured to receive the second portion of the support member.

9. The locking support assembly according to claim 8, wherein the housing includes a tapered surface extending downward from the lower slot side toward the channel.

10. A tool support structure, comprising:
a base;
a tool rail that extends in an axial direction;
one or more locking support assemblies configured to releasably mount the tool rail to the base, each locking support assembly comprising a support member connected to the tool rail and a support receiver associated with the support member connected to the base;
wherein the support member of each locking support assembly comprises a first portion connected to the tool rail and a second portion, the first portion having a first width, the second portion having a second width that is greater than the first width, and the first portion extending transversely away from the second portion;
wherein the support receiver of each locking support assembly comprises a housing coupled to the base, a clamp member, and a locking member;
wherein the housing defines an interior space, a slot extending in the axial direction adjacent the interior space, and an axial open end in communication with the interior space and the slot, the slot having a third width adjacent to an exterior surface of the housing, which is greater than the first width for axially receiving the first portion of the support member therein and which is less than the second width, and the interior space having a fourth width adjacent to the slot, which is greater than the second width for axially receiving the second portion of the support member therein;
wherein the clamp member is disposed within the housing adjacent to the slot and is pivotally connected to the housing to engage and restrain the support member; and
wherein the locking member is connected to the housing and operable to engage and restrain the clamp member, the locking member being movable between an engaged position and a disengaged position.

11. The tool support structure according to claim 10, further comprising a mount plug assembly that provides at least one of an electrical or a pneumatic connection between the base and the tool rail, the mount plug assembly comprising a mount plug connected to the tool rail and a mount plug receiver connected to the base.

12. The tool support structure according to claim 11, wherein the mount plug is configured to move in an axial direction between a connected position and a disconnected position with the mount plug receiver.

13. The tool support structure according to claim 10, wherein the one or more locking support assemblies includes a plurality of locking support assemblies configured for simultaneous axial receipt of each support member in the support receiver associated therewith.

14. The tool support structure according to claim 13, wherein the housing of each locking support assembly includes an upper slot side, a lower slot side, and a slot end that collectively define the slot, and the lower slot side extends further axially from the slot end than does the upper slot side.

15. The tool support structure according to claim 14, wherein the plurality of locking support assemblies are configured for simultaneous support of each support member by the lower slot side of the support receiver associated therewith prior to insertion of the support member in the support receiver associated therewith.

16. The tool support structure according to claim 14, wherein the housing of each locking support assembly includes a channel adjacent to and below the lower slot side, the channel being configured to receiver the second portion of the support member associated therewith.

17. The tool support structure according to claim 16, wherein the housing of each locking support assembly includes a tapered surface extending downward from the lower slot side toward the channel.

18. The tool support structure according to claim 13, wherein when the plurality of locking support assemblies are arranged in an orientation in which the widths are measured in a vertical direction, the second portion of each support member extends upward and downward from the first portion, and the clamp member of each support receiver includes a stepped portion configured to engage the first portion and the second portion of the support member associated therewith simultaneously at different elevations.

19. The tool support structure according to claim 10, wherein the support receiver of each locking support assembly is detachable from the base, and the support member of each locking support assembly is detachable from the tool rail.

20. A tool support structure, comprising:
a base;
a tool rail that extends in an axial direction;
a first mounting portion that is connected to the base;
a second mounting portion that is connected to a first end of the tool rail, wherein the second mounting portion is releasably connectable to the first mounting portion for supporting the first end of the tool rail with respect to the base;
a support receiver that is connected to the base, the support receiver having a housing, a clamp member, and a locking member, the housing defining an interior space, a slot that extends in the axial direction, and an axial open end in communication with the interior space and the slot, the slot having a first width adjacent to an exterior surface of the housing, the interior space having a second width adjacent to the slot that is wider than the first width, the clamp member being disposed within the housing adjacent to the slot and pivotally connected to the housing, the locking member being connected to the housing and operable to restrain movement of the clamp member, and the locking member being movable between an engaged position and a disengaged position; and
a support member having a first portion and a second portion, the first portion is connected to the tool rail, the first portion is narrower than the first width, and the second portion, and the second portion is wider than the first width, wherein the second portion and at least part of the first portion are configured to enter the axial open end of the housing of the support receiver such that the second portion is disposed in the interior space of the housing and at least part of the first portion is disposed in the slot of the housing, and the clamp member is pivoted into engagement with the support member when the locking member is in the engaged position to restrain motion of the support member with respect to the support receiver.

* * * * *